United States Patent [19]
Häkli

[11] Patent Number: 4,611,428
[45] Date of Patent: Sep. 16, 1986

[54] METHOD AND EQUIPMENT FOR PLANTING OF BAND BALL PLANTS

[75] Inventor: Marja H. Häkli, Porvoo, Finland

[73] Assignee: Lännen Tehtaat Oy, Iso-Vimma, Finland

[21] Appl. No.: 654,566

[22] Filed: Sep. 26, 1984

[30] Foreign Application Priority Data

Sep. 26, 1983 [FI] Finland .................................. 833469

[51] Int. Cl.⁴ ............................................. A01G 9/02
[52] U.S. Cl. ........................................ 47/86; 47/79; 111/2
[58] Field of Search ............... 47/62, 64, 59, 77, 73, 47/74, 1 A, 86, 87, 84, 85, 63; 111/3, 2

[56] References Cited

U.S. PATENT DOCUMENTS

| | | | |
|---|---|---|---|
| 1,634,727 | 7/1927 | Roy | 47/63 |
| 3,172,234 | 3/1965 | Eavis | 47/59 |
| 3,664,062 | 5/1972 | Danielson | 47/84 X |
| 3,744,183 | 7/1973 | Kato | 47/62 |
| 3,844,932 | 11/1974 | Adams | 47/73 |
| 3,987,585 | 10/1976 | Greenbaum | 47/85 |
| 4,014,135 | 3/1977 | Greenbaum | 47/86 |
| 4,106,415 | 8/1978 | Häkli | 111/3 |
| 4,118,891 | 10/1978 | Kehl et al. | 47/59 |
| 4,178,715 | 12/1979 | Greenbaum | 47/86 |
| 4,222,199 | 9/1980 | Kehl | 47/59 |

FOREIGN PATENT DOCUMENTS

| | | | |
|---|---|---|---|
| 2017100 | 10/1970 | Fed. Rep. of Germany | 47/86 |
| 7705282 | 11/1977 | Netherlands | 47/86 |
| 8004841 | 4/1982 | Netherlands | 47/77 |
| 261559 | 5/1949 | Switzerland | 47/86 |
| 668757 | 3/1952 | United Kingdom | 47/73 |

OTHER PUBLICATIONS

"Hygro Cultivation Systems" from The Grower, 11-1-5-79.
"Hardy Nursery Stock Production in Nutrient Film" from The Grower, May 4, 1974.

Primary Examiner—Robert A. Hafer
Assistant Examiner—Danton DeMille
Attorney, Agent, or Firm—Burns, Doane, Swecker & Mathis

[57] ABSTRACT

Method and equipment for planting of band ball plants in which the plants are grown in a cassette consisting of a bottom part and an upper part (2). The bottom part comprises several parallel grooves. The upper part is made of paper coated with plastic, and having perforations (19) to produce a ball support network when tamped from above. The plants in a groove are separated by folds (17) of the upper part, which straighten when the bands are pulled after the incubation from the grooves.

20 Claims, 14 Drawing Figures

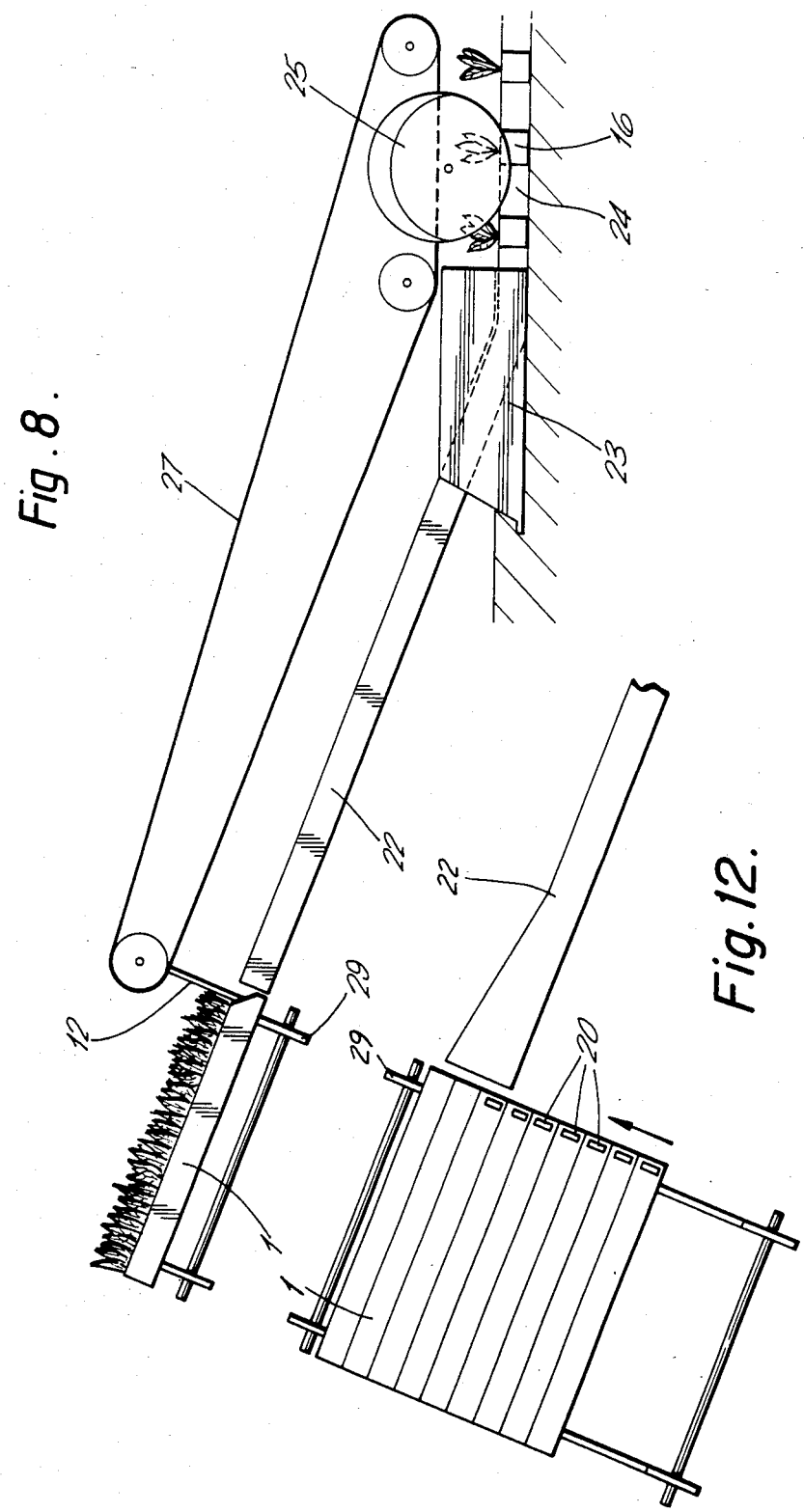

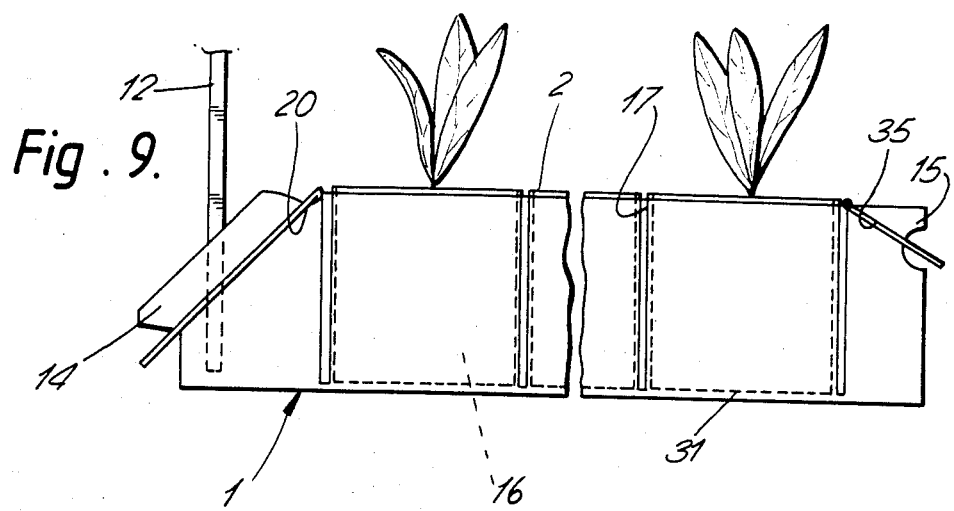
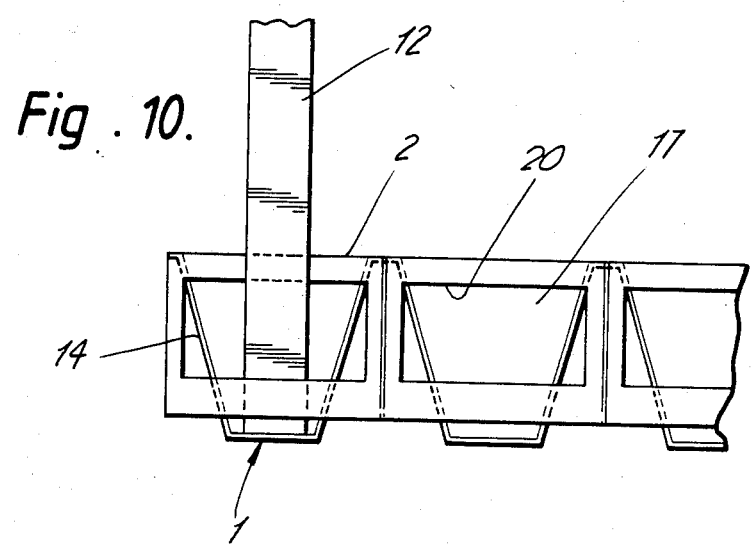
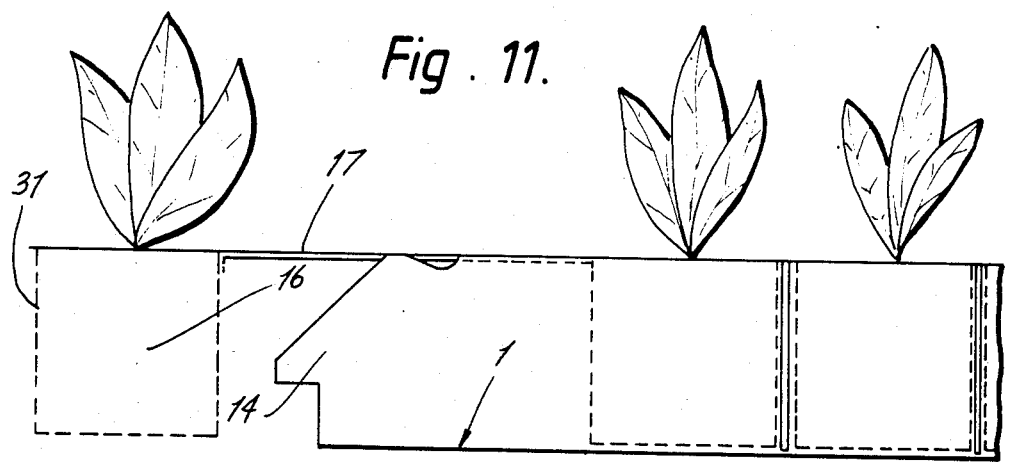

METHOD AND EQUIPMENT FOR PLANTING OF BAND BALL PLANTS

The present invention is concerned with a plant growing method in which ball plants in form of a band are used.

From prior art are known plant growing cells in band-shaped form in which the root ball is surrounded by cell systems wound out of two vertical strips of paper, which cells are open at the top and at the bottom and between which cells narrow portions remain, or vertically positioned sleeves are known whose top and bottom ends are open and which have been brought into band shape by means of narrow portions, these narrow portions being weakened in view of detaching the plants from each other and planting them, or the detaching is performed by means of a shearing blade. The principle of the planting machine is similar to that of the prior-art subsurface drainage trench cutter, in which the drainage pipe, e.g. of plastics, is fed into the trench opened by the plow share.

It is a drawback of the plant growing cells described above that the—frequently quite slender—roots of vegetable plants cannot penetrate through the cell walls into the ground sufficiently well, or at all, and therefore the rooting of the plants is poor and the crop remains low. It is a further drawback that, since the plants must be detached from the chain and planted one by one, the spacing of the plants in the ground, the planting depth, and the vertical position of the plant ball are not always sufficiently precise, because, e.g. a leek plant, if the plant ball was planted in a slanting position, yields an individual plant of curved stem and inferior quality. The planting depth is very critical for many vegetable ball plants, because the growth zone must not remain too high above the ground surface, nor must it be placed too deep in the ground. Automatic planting is also very difficult.

In the present invention there is a plant growing cassette consisting of two parts, a bottom tray part comprising at least one trough open at one end that defines two of the sides and the bottom of the plant balls, and a sheet-formed upper part comprising a layer that does not decompose during incubation and which also includes, underneath the sheet and above the trough, parallel folds of a shape and size similar to the cross-section of the trough, so that the folds become positioned in the troughs. The sheet also includes yieldable portions between folds. After the base part is covered with the sheet and a layer of growth substrate is spread onto the covered trough, the growth substrate is tamped from above at the yieldable portions between the folds so that the sheet yields at the tamping points and balls are formed between the folds. Consequently, the parallel folds define forward and rear sides of the plant ball. After the incubation the sheet is removed by pulling it out of the trough so that the folds are opened.

The cassette comprises preferably several throughs placed at parallel side by side which are covered at the same time. Then the cover sheet has preferably a layer of the size of the entire sheet decomposing during the incubation as well as, facing each trough, a band-like layer that does not decompose during the incubation and that is parallel to the trough and of a length at least equal to the length of the trough. Preferably each band is pulled separately out of its trough.

According to another preferable embodiment of the invention the troughs are covered by means of a sheet in which each band-like layer is provided with a hole at the open end of the trough, and that the bands are pulled out of their troughs by means of a rod placed into the said hole.

Below the bottom of the trough there can be a pipe, from which holes or slots pass into the bottom of the trough, and when the plants are pulled out of their trough, water or air can be pressed through the pipe to the bottom of the trough.

In the sheet, between the folds, there are preferably weakenings that form strips so that, when the sheet is depressed from above between the folds, a basket-shaped recess is formed out of the strips.

The edges of each fold have been preferably joined together at the surface of the sheet by means of a joint that opens itself during the incubation.

According to still another embodiment of the invention the ends of the bands are provided with holes and the ends of the troughs are provided with fastening members corresponding to the said holes.

Experiments have shown that a plant ball that is surrounded in the longitudinal direction of the band just by an undense supporting network and whose both sides are completely free from elements inhibiting growth of the roots is rooted very well and rapidly. During planting, the distances between the plants become very precisely as long as desired, and variations in the planting depth are very little. Also, the position of the plant ball after planting is very good and uniform. Owing to the precise spacing of the plants, the band ball lines in accordance with the present invention can also be planted in a sort of zig-zag form, whereat the plant in the next line is always placed between two plants in the preceding line.

In the following, the invention will be described by means of the attached drawings:

FIG. 8 is a side view of an automatic planting machine.

FIG. 9 is a side view of a plant-growing cassette constructed in accordance with a preferred embodiment of the present invention.

FIG. 10 is an end view of the cassette of FIG. 9.

FIG. 11 is the plant-growing cassette of FIG. 9 with the band ball plant line partly pulled out.

FIG. 12 is a top view of the feeding plane of the planting machine.

Figure 1:
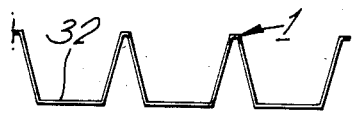
FIG. 1 is an end view of the tray part of a plant growing cassette constructed in accordance with a preferred embodiment of the present invention.
Figure 3:
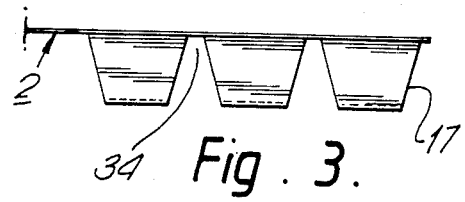
FIG. 3 is an edge view of the upper sheet part of the cassette.
Figure 2:
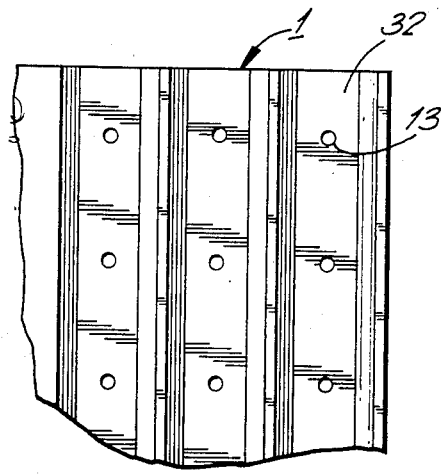
FIG. 2 is a top view of the tray part of the cassette.

The bottom part of the plant-growing cassette 1 (FIGS. 1 and 2) is provided with a number of grooves 32, whose size depends on the plant for which they are meant; under these circumstances, the dimensions of the grooves determine the shape of the plant ball in the transverse direction of the cassette. The grooves have been made slightly narrower at the bottom as compared with the top portion in order to facilitate the detaching of the line of plant balls and to reduce the requirement of storage space. At the bottom of the grooves, there are holes 13 for the draining of excessive watering moisture. The cassette is preferably made of suitable plastic so to be capable of enduring several times of use. At the ends of the bottom part of the cassette, there are fastening points 14 and 15 (FIG. 9).

Onto the bottom part of the cassette, the upper part 2, the sheet, is positioned (FIGS. 3 to 6 and 9). The sheet includes yieldable portions 2a is made of paper 10 coated with plastics 11 or non-woven fabric, and it is equally wide as, or slightly wider than, the bottom part. In the longitudinal direction, there is a series of transverse folds 17 always between the balls 16, which folds extend down to the bottom of the grooves in the bottom part and form a wall preventing growth of the roots from one ball into the other. The folds have been glued at their upper portions 18 by means of a glue soluble in water. These folds have been cut so that they can reach the bottom of the grooves. Each plant-ball position in the sheet has been perforated so as to produce a ball support network 19. Between all plant ball spaces (in the longitudinal direction of the cassette) the plastic or fibre laminate has been melted off 30 up to the paper. One end of the sheet is provided with holes 20 for fastening to the bottom part and for the fetching member 12, and the other end with holes 35 for fastening to the bottom part.

The planting machine is shown in FIGS. 8 and 12. It is provided with a plant cassette 1, with a plant-line fetching member 12, a feed trough 22, a plow share 23, a furrow 24 opened by the plow share, compacting wheels 25, band ball plants 26, operating mechanism 27 for the fetching member 12, fetching point 20 for the fetching member, and with a conveyor 29 shifting the plant cassette in the lateral direction.

The band ball plant method and the planting machine for a line of band balls operate as follows: The upper part of the cassette is placed onto the bottom part and fixed by the holes 20 and 35 to the fastening points 14 and 15 in the bottom part. Hereinafter the cassette is filled with the filling material. A uniform layer of the filling material is spread onto the sheet, and the filling material is compacted tightly on top of the weakenings 19 provided in the sheet either in a filling machine, which is mostly provided with mechanically operating brushes moving up and down, or manually be means of a brush with stiff bristles, whereby the narrow portions 17 remaining between the plant balls 16 are separated to their correct positions and the network 31 (FIG. 6) provided by means of the weakening of the plant ball surrounds the ball at the front, at the rear, and at the bottom of the ball. The seeds are sown into the cassette, and the cassette is taken into a moist, warm space, such as a greenhouse. In the moist and warm conditions, the paper 10 decays out of the sheet and the glueing 18 soluble in water is opened, whereas the plastics 11 or the non-woven fabric remain, and as a result of this each line of plants is detached as a unit of its own, to be handled separately.

At the planting stage, the plant cassette is placed onto the conveyor 29 (FIGS. 8 and 12) in the planting machine. The fetching member 12 fetches each line of band balls from the fetching point 20 and shifts it, by pulling by the end, along the feed trough 22 into the furrow 24 opened by the plow share 23. The compacting wheels 25 close the furrow 24 and press the plant balls into tight contact with the surrounding soil. In practice, the planting machines mostly comprise several lines, about 2 to 12 planting units in one machine.

Figure 7:
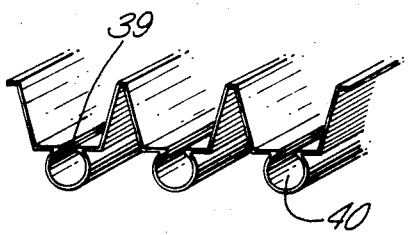
FIG. 7 is a perspective view of the bottom part of a cassette with a draining pipe.
Figure 5:
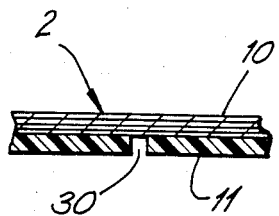
FIG. 5 is a sectional view at position of (A—A) of FIG. 4.
Figure 6:
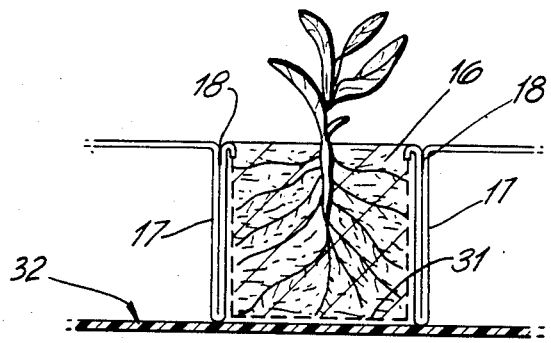
FIG. 6 is a sectional view at position (B—B) of FIG. 4.

From the bottom part of the cassette, any excessive water resulting from excessive watering can also be removed in the way shown by FIG. 7. Therein, a pipe 40 has been formed underneath the bottom part, which pipe is connected with the bottom of the ball via a narrow slot 39 or holes. This may also be used for detaching the line of band ball plants at the planting stage by passing pressurized water or air into the pipe, whereby the line of balls is detached and, when it is pulled with a little force, glides along the grooves in the bottom part of the cassette.

Figure 4:
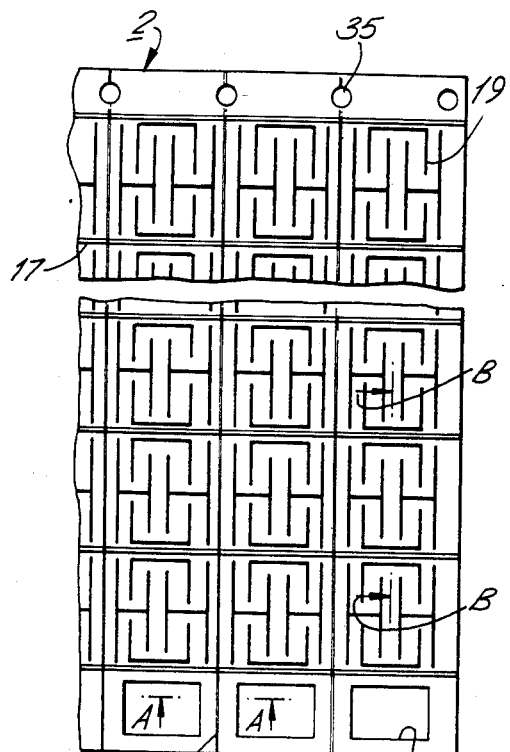
FIG. 4 is a top view of the upper sheet part of the cassette.

The weakening of the area 19 of the plant ball shown in FIG. 4 may differ from that shown in the figure. Different sizes and different depths require different support networks of different strengths, and it is also possible to use the narrow portions 17 in order to produce the support network, in addition to the space of the ball, especially in the case of balls whose depth is larger than the diameter of the ball.

The narrow portions 17 determine the length of the space between the plants on planting, and if, for example, the height (depth) of a ball is 3 cm and the dimensions of the top portion of the ball are $2.5 \times 2.5$ cm (as viewed from above) and the narrow portion extending from the top edge of a ball to the level of the bottom of the ball and back to the top edge of the adjoining ball is straightened, as takes place when the line of band balls is being planted, the spacing of the plants becomes $3+3=6$ cm, which is the dimension of the narrow portion as straightened and $2 \times 1.25$ cm$=2.5$ cm, which is the distance from the edge of the ball to plant, as well as from the edge of the next ball to the plant, so that in total, the spacing of the plants becomes 6 cm$+2.5$ cm$=8.5$ cm, which is highly suitable, e.g., for leek, whereas, e.g., for cauliflower, a spacing of plants of 32.5 cm may be suitable, which consists of five folds, so that $5 \times (3+3 \text{ cm})=30$ cm$+2.5$ cm$=32.5$ cm. Moreover, there may be folds of shorter dimension, by means of which the spacing of the plants can be determined highly precisely as desired.

The sheet may also be manufactured so that, onto the paper blank, a pattern is printed or sprayed by using plastics or a glue or equivalent, which forms the necessary network for surrounding the ball after the paper has decayed at the plantgrowing stage, and that a corresponding strip is applied to both sides of the line of balls, which strips endure the pulling of the line of band balls out of the cassette, as well as a wider face remaining between the balls so as to prevent growth of the roots from one ball into the other.

Instead of attachments 14 and 15 for fastening the sheet, the sheet may also be attached onto the bottom part in some other suitable way, e.g. by glue, during the filling and sowing stages.

The sheet may also be constructed so that, when the plastic is heated off along a line in the longitudinal direction of the cassette, between the lines of balls, an unmelted portion is allowed to remain therein alternatingly at both ends, whereby, upon the decomposition of the paper, the sheet comprises one continuous line of band balls, and thereby the cassette can be discharged by pulling to the side of the cassette and upwardly slantingly.

Figure 13:
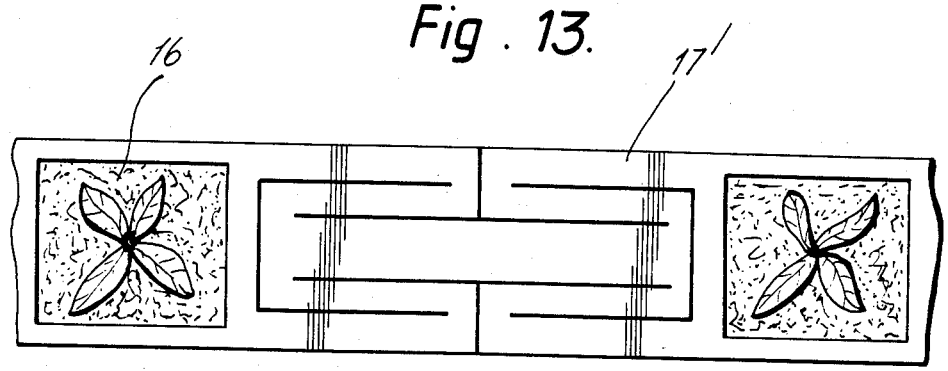
FIG. 13 is another preferred embodiment lengthening the yieldable portions between the plant balls.

In an alternate preferred embodiment, the narrow portion 17' is cut in accordance with the pattern of FIG. 13, so that the original length of the narrow portion 17' after unfolding can be, e.g., doubled when the network formed by the pattern are pulled apart. The narrow zones 17' of this embodiment are originally placed in a folded condition as are the narrow zones 17 of the first preferred embodiment, whereby economies are obtained in the raw-material of the sheet, and the quantity of plastics ending up in the field is reduced.

Figure 14:
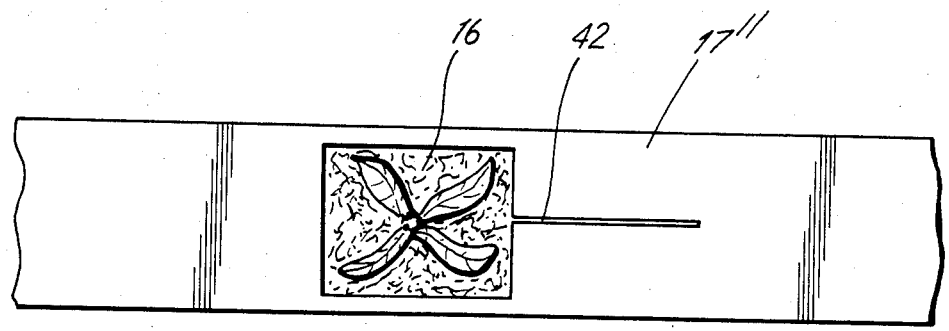
FIG. 14 is another preferred embodiment with modified yieldable portions between the plant balls.

Weakening perforation for the sheet may also be in accordance with FIG. 14 (with the band pulled open), wherein the plastic 17'' has been melted off a certain distance 42 from the space of the plant ball in the longitudinal direction of the band with the purpose that the, e.g., root plant growing in the ball may require a larger space for growth in the lateral direction than what is permitted by the original opening, whereby this prevents any disturbance of the growth and any choking effect of the plastic or fibre network surrounding the band ball upon the plant.

If it is desirable to use the band ball method for growing ball plants that can be detached from the sheet one by one, the blank of the sheet can be prepared in advance so that the plastic or fibre material is removed by heating along a line between the lines of balls both in the longitudinal and in the lateral direction of the sheet, whereby, on decomposition of the paper at the growing stage, the band ball plants can be handled in the same way as any ball plants grown separately.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes and variations which come within the meaning and range of the claims are therefore intended to be embraced therein.

What is claimed is:

1. A device for the growing and planting of plants, comprising trough means open at one end and a multi-layered sheet covering the trough, said sheet including a decomposable layer of a size of the entire sheet and a less decomposable band-like layer facing said trough, said sheet including folded portions which are positioned in said trough so as to extend across said trough and have a shape and size substantially conforming with the cross-section of the trough, whereby balls of growth substrate may be formed between adjacent folded portions.

2. The device as claimed in claim 1, wherein the sheet, between the folded portions includes weakening means for forming strips, said strips being interconnected such that, when the sheet is depressed from above between the folded portions, said strips form a basket.

3. The device as claimed in claim 2, wherein edges of each fold have been joined together at the surface of the sheet by a decomposable adhesive.

4. The device as claimed in claim 2, wherein a hole is provided at an end of the band, which end of the band is adjacent to said open end.

5. The device as claimed in claim 1, wherein edges of each fold have been joined together at a surface of the sheet by a decomposable adhesive.

6. The device as claimed in claim 5, wherein a hole is provided at an end of the band, which end of the band is adjacent to said open end.

7. The device as claimed in claim 1, wherein a hole is provided at an end of the band, which end of the band is adjacent to said open end.

8. The device as claimed in claim 1, wherein both ends of the band are provided with holes and the ends of the trough is provided with fastening members for engaging said sheet covering at said holes.

9. The device of claim 1, wherein said trough forming means forms several parallel, side-by-side troughs, said sheet covering said troughs.

10. A method of growing plants, comprising the steps of:
    providing a trough with an open end;
    providing a sheet covering which includes depending folded portions and yieldable portions between said folded portions, said folded portions having a shape similar to a cross-sectional shape of said trough;
    placing said sheet covering over said trough with the folded portions being placed in said trough and disposed across said trough;
    placing a growth substrate onto the covered trough;
    forming balls of growth substrate between adjacent folded portions by tamping said growth substrate at said yieldable portions, said tamping causing the yieldable portions to yield;
    germinating plants in said balls; and
    removing said balls from said trough by pulling the sheet covering out from said open end and opening the folds.

11. The method as claimed in claim 21, wherein said trough forming step forms several troughs placed parallel and side by side to each other, said covering step covering said several troughs simultaneously.

12. The method as claimed in claim 11, wherein the troughs are covered with a multi-layer sheet, which sheet has a decomposable layer of a size of the entire sheet and band-like layers that do not decompose during an incubation period of said germinating step and have a length at least equal to the length of the trough, said covering step placing said band-like layers over and parallel to said troughs, said method further comprising the steps of decomposing said decomposable layer during said incubation period.

13. The method as claimed in claim 12, wherein, after the incubation period, each band-like layer is pulled separately out of its trough.

14. The method as claimed in claim 12, wherein each band-like layer is provided with a hole adjacent the open end of the trough, and said removing step includes placing a rod into said hole.

15. The method as claimed in claim 13, wherein each band-like layer is provided with a hole adjacent the open end of the trough, and said removing step includes placing a rod into the hole.

16. A method as claimed in claim 13, wherein said method further comprises the step of passing pressurized fluid to a bottom of the trough through an opening at the bottom of the trough.

17. A method as claimed in claim 14, wherein said method further comprises the step of passing pressurized fluid to a bottom of the trough through an opening at the bottom of the trough.

18. The method as claimed in claim 12, wherein said method further comprises the step of passing pressurized fluid to a bottom of the trough through an opening at the bottom of the trough.

19. The method as claimed in claim 11, wherein said method further comprises the step of passing pressurized fluid to a bottom of the trough through an opening at the bottom of the trough.

20. A method as claimed in claim 10, wherein said method further comprises the step of passing pressurized fluid to a bottom of the trough through an opening at the bottom of the trough.

* * * * *